United States Patent
Ebsen et al.

(10) Patent No.: US 9,933,838 B2
(45) Date of Patent: Apr. 3, 2018

(54) POWER MANAGEMENT IN A STORAGE COMPUTE DEVICE

(71) Applicant: Seagate Technology LLC, Cupertino, CA (US)

(72) Inventors: David Scott Ebsen, Minnetonka, MN (US); Ryan James Goss, Prior Lake, MN (US); Jeffrey L. Whaley, Minneapolis, MN (US); Dana Simonson, Owatonna, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 458 days.

(21) Appl. No.: 14/495,215

(22) Filed: Sep. 24, 2014

(65) Prior Publication Data

US 2016/0085291 A1    Mar. 24, 2016

(51) Int. Cl.
  *G06F 1/32*    (2006.01)
(52) U.S. Cl.
  CPC .......... *G06F 1/3268* (2013.01); *G06F 1/3275* (2013.01); *G06F 1/3296* (2013.01)
(58) Field of Classification Search
  None
  See application file for complete search history.

(56) References Cited

U.S. PATENT DOCUMENTS

| | | | |
|---|---|---|---|
| 6,611,473 B2 | 8/2003 | Al-Shamma et al. | |
| 7,325,050 B2 * | 1/2008 | O'Connor | G06F 1/263 709/223 |
| 8,255,715 B2 * | 8/2012 | Kawakami | G06F 1/3203 713/320 |
| 8,489,780 B2 | 7/2013 | Sundaram et al. | |
| 8,935,463 B1 * | 1/2015 | Aswadhati | G06F 3/061 711/103 |
| 9,003,109 B1 * | 4/2015 | Lam | G06F 3/0688 711/103 |
| 2003/0195938 A1 * | 10/2003 | Howard | G06F 8/45 709/208 |
| 2008/0201561 A1 * | 8/2008 | Bates | G06F 9/4881 712/228 |
| 2009/0300274 A1 * | 12/2009 | Luo | G06F 3/0611 711/103 |
| 2011/0029590 A1 * | 2/2011 | Bailey | G06F 11/004 709/202 |
| 2012/0221771 A1 * | 8/2012 | Yoon | G06F 12/0246 711/103 |
| 2013/0117630 A1 * | 5/2013 | Kang | G06F 11/1048 714/763 |
| 2013/0159744 A1 * | 6/2013 | Gooding | G06F 1/3234 713/320 |
| 2013/0191555 A1 * | 7/2013 | Liu | G06F 3/061 710/5 |

(Continued)

*Primary Examiner* — Jaweed A Abbaszadeh
*Assistant Examiner* — Cheri Harrington
(74) *Attorney, Agent, or Firm* — Hollingsworth Davis, LLC (57) ABSTRACT

Computations are performed on data objects via two or more data storage sections. The data storage sections facilitate persistently storing the data objects in parallel read/write operations. The data objects are used in computations within a storage compute device. At least one of the storage sections is deactivated during the computations to reduce power usage of the storage compute device.

20 Claims, 7 Drawing Sheets

(56) References Cited

U.S. PATENT DOCUMENTS

| | | | | |
|---|---|---|---|---|
| 2013/0212345 A1* | 8/2013 | Nakajima | ............ | G06F 3/0605 |
| | | | | 711/161 |
| 2013/0262612 A1* | 10/2013 | Langas | ................ | G06F 3/0605 |
| | | | | 709/211 |
| 2013/0290598 A1* | 10/2013 | Fiske | .................... | G06F 3/0625 |
| | | | | 711/103 |
| 2014/0095912 A1* | 4/2014 | Hurd | .................... | G06F 1/3234 |
| | | | | 713/323 |
| 2014/0143579 A1 | 5/2014 | Grokop et al. | | |
| 2014/0164618 A1* | 6/2014 | Alicherry | .............. | G06F 9/5072 |
| | | | | 709/226 |
| 2014/0310552 A1* | 10/2014 | So | ........................ | G06F 1/3275 |
| | | | | 713/324 |
| 2015/0149695 A1* | 5/2015 | Khan | .................... | G06F 3/0641 |
| | | | | 711/103 |
| 2015/0193146 A1* | 7/2015 | Aswadhati | .............. | G06F 3/061 |
| | | | | 710/313 |
| 2016/0011786 A1* | 1/2016 | Ninose | ................ | G06F 12/0246 |
| | | | | 711/103 |
| 2016/0041856 A1* | 2/2016 | Sankaralingam | ... | G06F 15/7821 |
| | | | | 719/330 |
| 2016/0072885 A1* | 3/2016 | Chadha | ................ | G06F 3/0665 |
| | | | | 709/213 |

* cited by examiner

POWER MANAGEMENT IN A STORAGE COMPUTE DEVICE

SUMMARY

Some embodiments involve a storage compute device comprising two or more data storage sections that facilitate persistently storing data objects in parallel read/write operations. The data objects are used in computations within the storage compute device. A compute section performs the computations on the data objects via the two or more data storage sections. A processing unit provides a signal to the compute section, wherein the signal causes at least one of the storage sections to be deactivated during the computations to reduce power usage of the storage compute device.

Some embodiments involve a method of performing computations on data objects via two or more data storage sections. The data storage sections facilitate persistently storing the data objects in parallel read/write operations. The data objects are used in computations within a storage compute device. At least one of the storage sections is deactivated during the computations to reduce power usage of the storage compute device.

Some embodiments involve a non-transitory, computer-readable storage medium configured with instructions executable by a processor of a storage compute device to perform computations on data objects via two or more data storage sections. The data storage sections facilitate persistently storing the data objects in parallel read/write operations. The data objects are used in computations within the storage compute device. At least one of the storage sections are deactivated during the computations to reduce power usage of the storage compute device.

BRIEF DESCRIPTION OF THE DRAWINGS

In the following diagrams, the same reference numbers may be used to identify similar/same components in multiple figures. The drawings are not necessarily to scale.

DETAILED DESCRIPTION

Some computational tasks are suited for massively distributed computing solutions. For example, data centers that provide web services, email, data storage, Internet search, etc., often distribute tasks among hundreds or thousands of computing nodes. The nodes are interchangeable and tasks may be performed in parallel by multiple computing nodes. This parallelism increases processing and communication speed, as well as increasing reliability through redundancy. Generally, the nodes may include rack mounted computers that are designed to be compact and power efficient, but otherwise operate similarly to desktop computer or server.

For certain types of tasks, it may be desirable to rearrange how data is processed within the individual nodes. For example, applications such as neuromorphic computing, scientific simulations, etc., may utilize large matrices that are processed in parallel by multiple computing nodes. In a traditional computing setup, matrix data may be stored in random access memory and/or non-volatile memory, where it is retrieved, operated on by relatively fast central processor unit (CPU) cores, and the results sent back to volatile and/or non-volatile memory. It has been shown that the bus lines and I/O protocols between the CPU cores and the memory can be a bottleneck for computations such as these.

This disclosure generally relates to use of a data storage device that performs internal computations on data on behalf of a host, and is referred to herein as a storage compute device. While a data storage device, such as a hard drive, solid-state drive (SSD), hybrid drive, etc., generally include data processing capabilities, such processing is mostly related to the storage and retrieval of user data. So while the data storage device may perform some computations on the data, such as compression, error correction, etc., these computations are invisible to the host. Similarly, other computations, such as logical-to-physical address mapping, involve tracking host requests, but are intended to hide these tracking operations from the host. In contrast, a storage compute device makes computations based on express or implied instructions from the host, with the intention that some form of a result will be returned to the host and/or be retrievable by the host.

While a storage compute device as described herein may be able to perform as a conventional storage device, e.g., handling host data storage and retrieval requests, such devices may include additional computational capability that can be used for certain applications. For example, scientific and engineering simulations may involve solving equations on very large matrices. Even though the matrices may be sparse, and therefore amenable to a more concise/compressed format for storage, the matrices may be cumbersome to move in and out of storage for performing operations.

While a conventional storage device can be used to store objects such as matrices, the device may not be given information that allows it to identify the objects. For example, host interfaces may only describe data operations as acting on logical block addresses (or sectors), to which the storage device translates to a physical address. In contrast, a storage compute device will obtain additional data that allows the storage device to manage the objects internally. This management may include, but is not limited to, selection of storage location, managing of object identifiers and other metadata (e.g., data type, extents, access attributes, security attributes), power management, compression, power conservation, and performance of single or multiple object computations and transformations. For example, the storage compute device may activate or deactivate sections of memory for power conservation. In some cases, deactivating a memory section involves causing the memory section to run at a lower power state.

Since a storage compute node is provided with parametric information about the data objects and what operations can be performed on that data, it can intelligently map the data to achieve a balance between power and performance. For example, an SSD with multiple channels of NAND may place objects for which there is a low performance requirement entirely within a single channel. The remainder of the NAND channels may be turned off. Therefore, deactivating one or more storage sections may be based on the parametric information. In some cases, an object which needs maximum performance, data may be spread across multiple and/or all of the channels. This may allow for increasing the performance by allowing for parallel fetch of the data. In some implementations, data may be segmented according to the needs of the algorithm matching the parallelism of the data fetch with the parallelism of the computation. This may provide increased benefits than what can be achieved by simple tiered memory systems which rely on moving data to 'hot' tiers based on recent access. That approach can result in degraded performance and increased power usage in situations where the algorithm continues to access new data as the device will move data that is no longer needed into the hot memory and pushing what will be needed into the cold memory.

Figure 1:
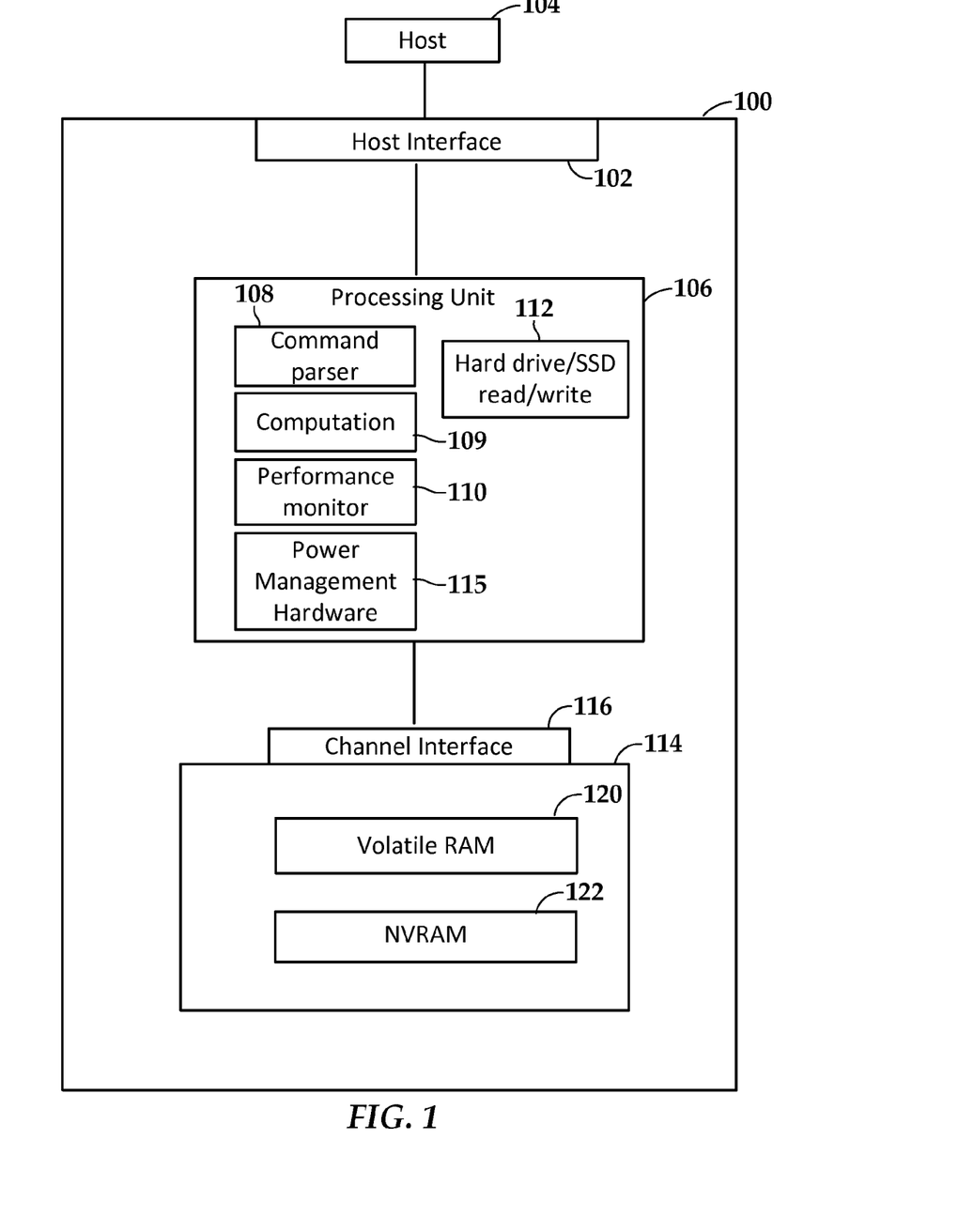
FIG. 1 is a block diagram of a storage compute device according to an example embodiment.

In embodiments described below, a storage compute device includes features for performing selective power management. In FIG. 1, a block diagram shows a storage compute device 100 according to an example embodiment. The storage compute device 100 may provide capabilities usually associated with data storage devices, e.g., storing and retrieving blocks of data, and may include additional computation abilities as noted above. Generally, the storage compute device 100 includes a host interface 102 configured to communicate with a host 104. The host interface 102 may use legacy electrical specifications and protocols associated with existing hard drive host interfaces, such as SATA, SaS, SCSI, PCI, Fibre Channel, etc.

The storage compute device 100 includes a processing unit 106. The processing unit 106 includes hardware such as general-purpose and/or special-purpose logic circuitry configured to perform functions of the storage compute device 100, including functions indicated in functional blocks 108-112. Functional block 112 provides legacy hard drive or SSD functionality, such as read, write, and verify operations on data stored in a storage section 114. Blocks 108-111 represent specialized functionalities that allow the storage compute device 100 to provide internal computations on behalf of the host 104.

Block 108 represents a command parser that manages object-specific and computation-specific communications between the host 104 and storage compute device 100. For example, the block 108 may process commands that define objects (matrices, vectors, scalars, sparse distributed representations) and operations (e.g., scalar/matrix mathematical and logical operations) to be performed on the objects. A computation section 109 performs the operations on the objects, and may be specially configured for a particular class of operation. For example, if the storage compute device 100 is configured to perform a set of matrix operations, then the computation section 109 may be optimized for that set of operations. The optimization may include knowledge of how best to store and retrieve objects for the particular storage architecture used by the storage compute device 100, and how to combine and compare data objects.

According to various embodiments, a performance monitor 110 analyzes the operations performed by the computation section 109 and makes determinations about how to adapt data transfer operations to achieve particular performance goals. In some cases, the performance monitor 110 is configured to make a determination monitor power consumption of the system and activate or deactivate portions of the memory and/or computation section 109 to conserve power. In some cases, the performance monitor 110 is configured to compress and decompress data objects (as well as intermediate calculation objects) as they are moved between a data storage section 114 and the compute section 109. This determination may include, among other things, compression that reduces the need for data channels that carry the data from the data storage section 114 to the compute section 109, allowing the data channels to be deactivated. Similarly, particular portions of the data storage section 114 (e.g., memory blocks, dies) may be selectively depowered if the compression of the data reduces need for the memory portions.

Power management hardware 115 may include hardware and firmware that is configured to monitor and control power consumption of the storage compute device. In some cases, the power management hardware activates and/or deactivates portions of the memory compute device. The portions may be activated during times when at least a part of the storage compute device is idle. The power consumption of the system may be tracked to determine times when at least a portion of the system is likely to be idle. A history of usage patterns may be used to determine when to activate and/or deactivate portions of the memory device. The power management software may also activate portions of the memory compute device in response to demand and/or at times when the system is not idle. The power management hardware 115 may be under control of the performance monitor 110, and its operations may be invisible to the computation engine 109. In some cases, the performance monitor includes compression hardware that compress and decompress objects, including the aforementioned intermediate computation objects.

As noted above, the functional blocks 108-112 at some point will access persistent storage, and this can be done by way of a channel interface 116 that provides access to the storage unit 114. There may be a multiple channels, and there may be a dedicated channel interface 116 and computation section 109 for each channel. The storage unit 114 may include both volatile memory 120 (e.g., DRAM and SRAM) and non-volatile memory 122 (e.g., flash memory, magnetic media). The volatile memory 120 may be used as a cache for read/write operations performed by read/write block 110, such that a caching algorithm ensures data temporarily stored in volatile memory 120 eventually gets stored in the non-volatile memory 122. The computation blocks 108, 109 may also have the ability to allocate and use volatile memory 120 for calculations. Intermediate results of calculations may remain in volatile memory 120 until complete and/or be stored in non-volatile memory 122.

As noted above, it is expected that intermediary objects may be too large in some instances to be stored in volatile memory 120, and so may be stored directly to non-volatile memory 122 while the calculation is ongoing. While non-volatile memory 122 may have slower access times than volatile memory 120, it still may be more efficient to work directly with non-volatile memory 122 rather than swapping the data in and out of volatile memory 122.

As noted above, the channel interface 116 may already be configured for parallel operations for conventional data storage. This parallelism may be extended for computation operations as well, as shown in the block diagram of FIG. 2. Generally, a storage compute device 200 includes multiple computation channels 202-205 that are coordinated by a device management component 206. There may be more or fewer channels than shown. The device management component 206 may include a general-purpose central processing unit and/or a custom logic circuit (e.g., field programmable gate array) that performs particular functions such as storage operations and computations. The device management component 206 may operate via an interface 208, e.g., a host interface or internal interface.

Figure 2:
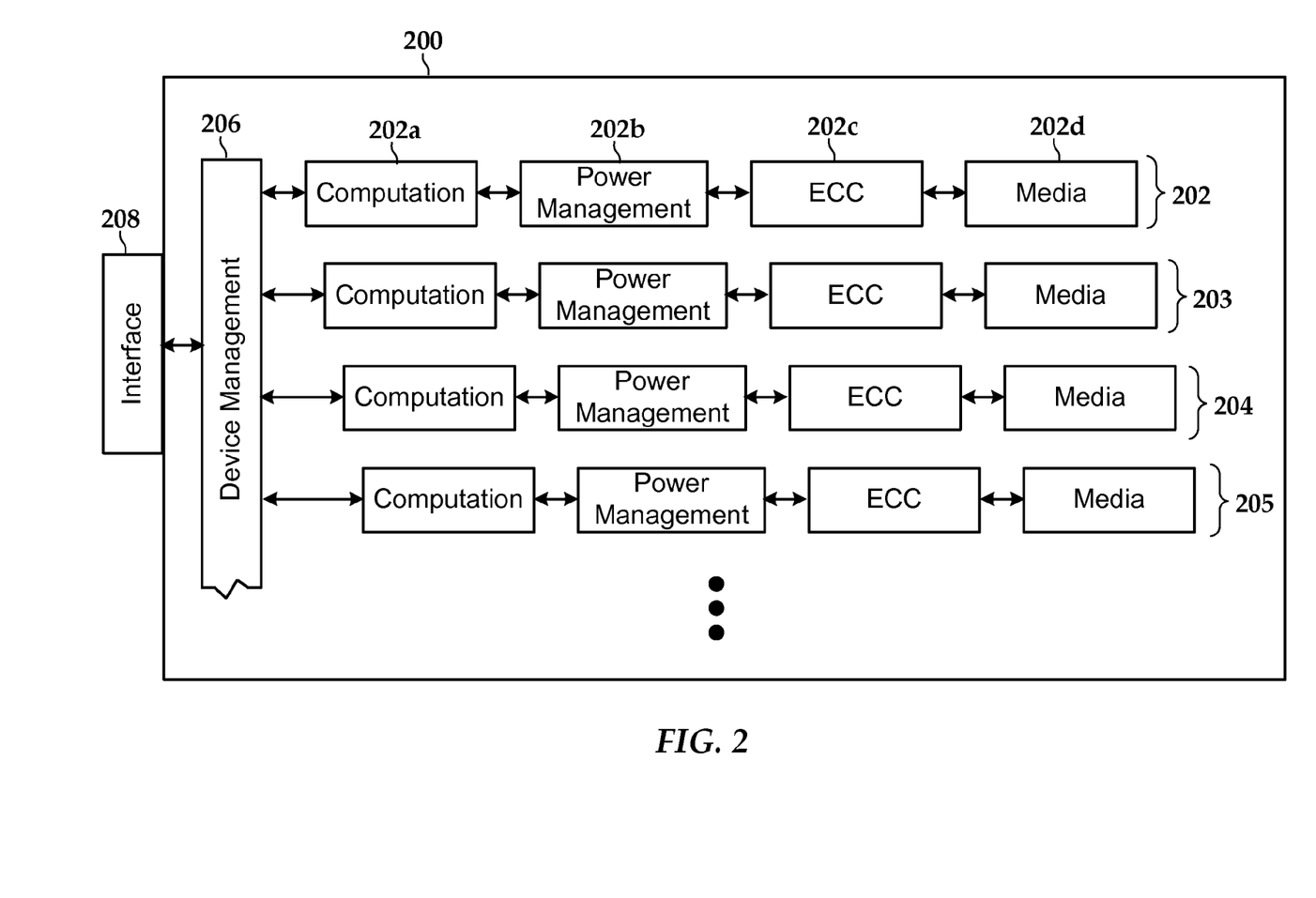
FIG. 2 is a block diagram showing multiple computation channels for a storage compute device according to an example embodiment.

Generally, the device management component 206 may analyze computations and determine how to allocate tasks between the channels 202-205. Using channel 202 as an example, it may include a computation section 202a, power management hardware 202b, error correction hardware 202c, and storage media 202d. The error correction hardware 202c and storage media 202d may be similar to those used in conventional devices, e.g., SSDs. Generally, the error correction hardware 202c adds error correction codes (ECC) to data encoded in the media 202d. The ECC is used to correct for channel and media errors when decoding data stored on the media 202d.

The computation section 202 is configured to perform part of a computation in parallel with computation engines of the other channels 203-205. The device management component 206 may decide on the division of work, divide the work accordingly, and dispatch the work to the channels 202-205. The device management component 206 or the computation section 202a may decide whether there is demand for power to the data storage section. This is communicated to the power management hardware 202b, which performs the appropriate activation and/or deactivation of power to the data storage section. In some cases, if a data object is 32 KB in size, for example and does not require specific performance, the data could be written down one channel tied to one compute resource. The channels and compute resources not in use can be deactivated and/or into a low power state. When the system is either idle or not saturated the portions of the system not immediately needed can be either deactivated or placed in a low power state to achieve a lower overall system power.

Generally, the storage compute device 200 may include a performance monitor (not shown) that provides guidance to the power management hardware 202b. This may be part of the computation section 202a, device management component 206, and/or an additional functional component. The performance monitor may receive 'hints' regarding power management from various other functional components. For example, the computation section 202a and/or device management component 206 may determine factors related to the intermediate data object itself, such as size, compressibility, how long the data object will be retained, likelihood of access, etc. The performance monitor may also determine, e.g., from an interface to the storage media 202d, characteristics of the media 202d, such as capacity, speed, endurance, wear, etc. Using these and other hints the performance monitor can give directions to the power management hardware 202b regarding when to activate and/or deactivate the data storage section.

The power management hardware 202b may include the ability to coordinate activities with corresponding hardware of the other channels 203-205. For example, if two or more of the channels 202-205 are computing (or scheduled to compute) portions of a single operation and it is found that fewer of the channels can be used without a significant impact on performance, a subset of the channels 202-205 may be chosen. The impact can be reduced by, e.g., compressing data streams into and out of the media 202d, if the media interface is a bottleneck. Other actions, such as alternatively activating channels 202-205 for processing, can reduce power if it is determined that the alternate activation does not have an unacceptable impact, or if conditions dictate that power must be reduced (e.g., temperatures above an acceptable range) even if it impacts performance.

As previously noted, a storage compute device may utilize different tiers of memory for storage of data objects, including intermediate objects. According to various embodiments the intermediate objects are temporary intermediate objects. The tiers may have different power requirements, and so selection of a particular tier may be another way to manage power consumption. An example of tiered storage according to an example embodiment is shown in the block diagram of FIG. 3. A storage unit 300 includes different tiers 302-305 having different characteristics. An example of those characteristics is shown in each block, using the following codes: 'C'—capacity; '$S_R$'—random access speed; '$S_S$'—sequential access speed; 'R'—retention, 'W'—wear, and 'P'—power consumption. For simplicity, each of these is given a score from 1-10. Generally, retention will be 9 or 10 for most persistent storage, and 1 for volatile storage due to the possibility of losing data upon unexpected power loss. The wear parameter is a measure of one or both of how much life is left on the media and how susceptible the media is to wear based on read write cycles. A high number represents less wear and/or susceptibility to wear.

Figure 3:
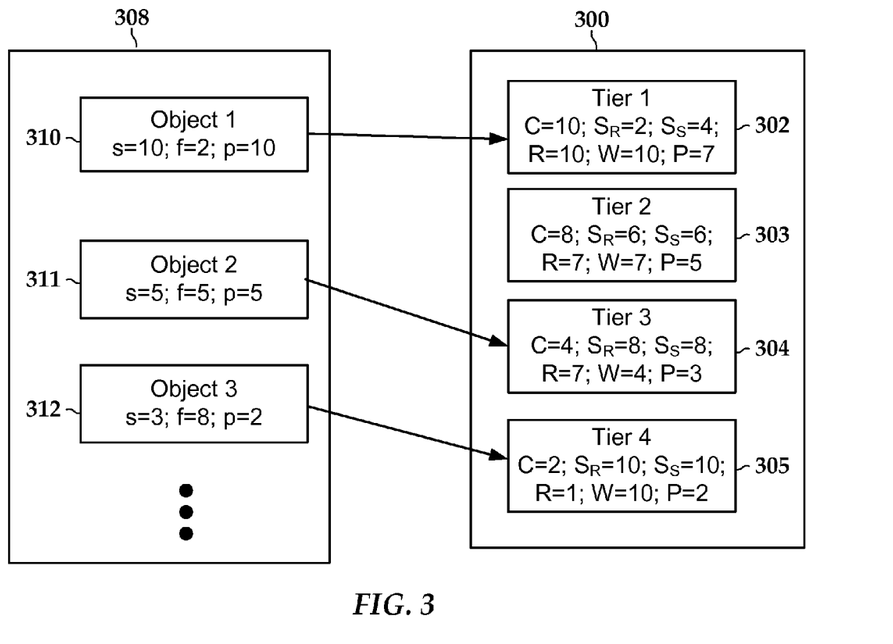
FIG. 3 is a block diagram illustrating the assignment of data objects to different tiers of memory according to an example embodiment.

A categorizer block 308 analyzes data object 310-312 as they are being processed. This processing may include initial storage of data objects (e.g., sent to the storage compute device from a host) and/or intermediate objects created as part of a computation. Each of the objects is given a rating using the following codes: 'p'—persistence; 's'—size; and 'f'—frequency of access. Again, these are given scores from 1-10. The categorizer block 308 chooses a tier for storage based on the codes for the data objects 310-312 and tiers 302-305. Object 310 is large (s=10) and requires long-term storage (p=10) and has a low frequency of access (f=3), and so is stored in tier based mostly on wear (W=10), capacity (C=10) and retention (R=10). Object 311 is medium sized (s=5) and with low frequency of access (f=2), and so is stored in tier 304 mostly due to its power consumption (P=3), capacity (C=8) and wear (W=7). Object 312 has a small size (s=3), a high frequency of access (f=8), and a low persistence (p=2) and so is stored in tier 305 mostly due to its power consumption (P=2), random access speed ($S_R$), and sequential access speed ($S_s$).

In some cases, the categorizer block 308 may balance power consumption with wear. For example, at times when at least a portion of the system is idle, objects that are likely to be accessed may be moved out of tiers with high power consumption and low wear into tiers with low power consumption and high wear so that the tiers with high power consumption can be deactivated. The power consumption may be linked with other characteristics that can affect wear, reliability, etc. For example, high power consumption may lead to high temperatures, which can degrade some components such as flash memory. In such a case, a trend to store data in lower power tiers may help reduce the temperatures and increase reliability.

Figure 4:
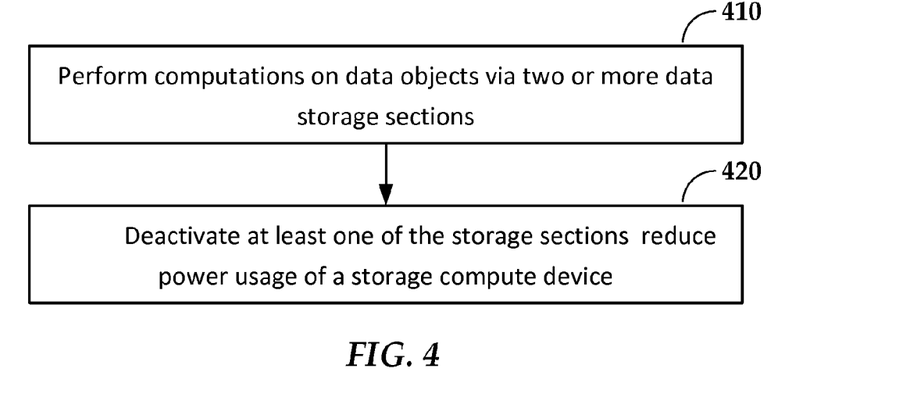
FIGS. 4-6 are flowcharts of methods according to example embodiments.

In FIG. 4, a flowchart illustrates a method according to some embodiments. The method involves performing 410 computations on data objects via two or more data storage sections. The data storage sections facilitate persistently storing the data objects in parallel read/write operations. At least one of the storage sections is deactivated 420 during the computations to reduce power usage of a storage compute device In FIG. 5, a flowchart illustrates a method according to some embodiments. The method involves defining 505 an object that will at least be stored in a storage unit, and may be used at some point in an internal computation. This may involve receiving a definition of the object from a host, and/or receiving a command for performing a computation on stored objects. Once defined, an estimation 510 is made of size and reuse requirements of the object. For example, if the object is a matrix, the size may be estimated by row and column count of the full matrices, or vector and matrix sizes of a reduced expression of the matrix, e.g., for sparse matrices. The reuse requirements may include an estimate of how many times the object may be retrieved from the storage unit. For user-defined objects, this may be unknown, but may be estimated for intermediate objects. If the storage compute device is internally creating the objects for a known series of computations, it may be able to know how often the object needs to be swapped in and out of storage.

Figure 5:
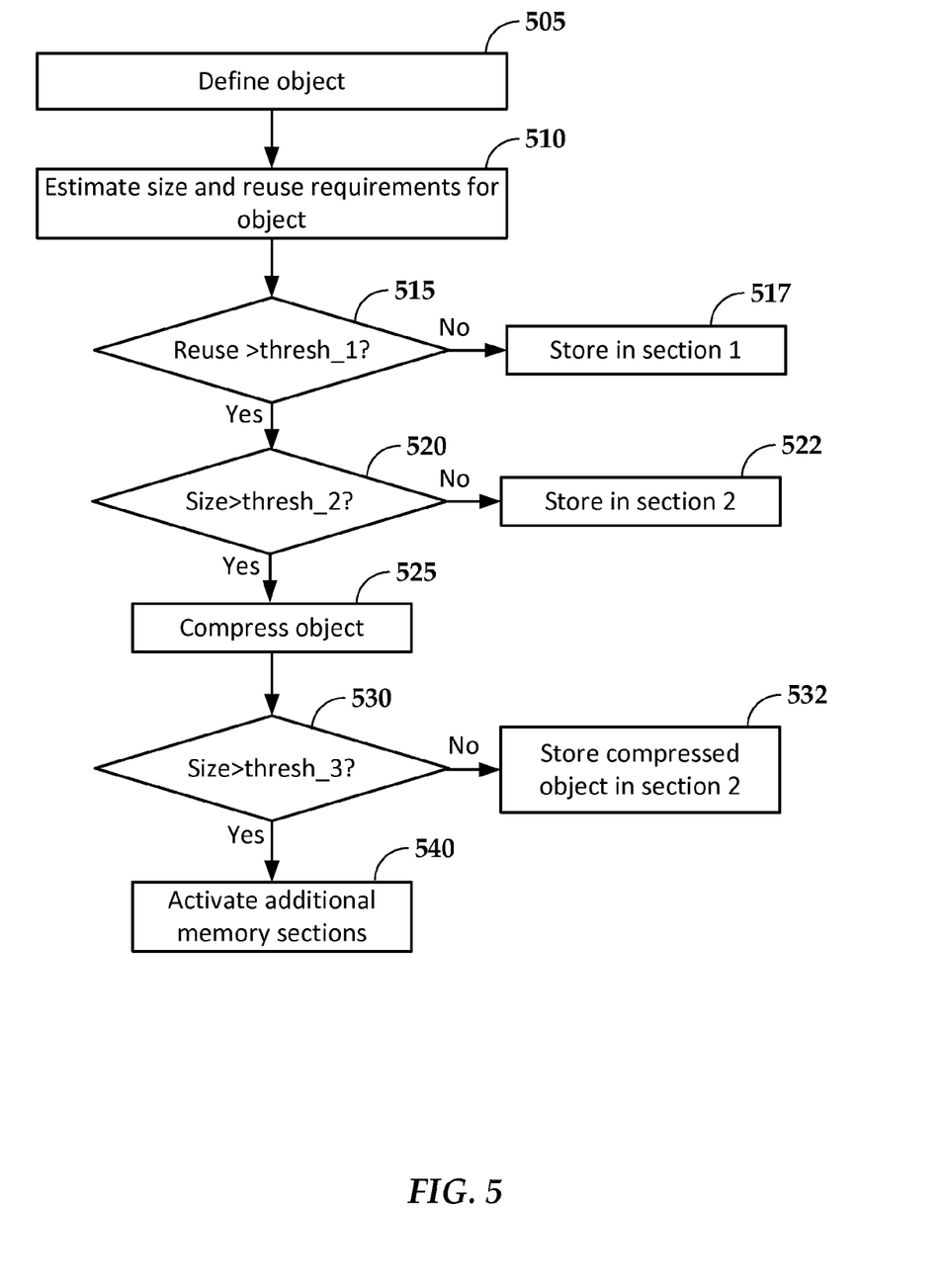

At block 515, a check is made as to the level of reuse, e.g., compared to a first threshold. If it is determined 515 that there is not a significant amount of reuse, the object may be stored 517 in a first data storage section. The first data storage section may be deactivated during a period of time when at least a portion of the system is idle. For example, the first data storage section may be deactivated at set intervals depending on use characteristics. In some cases, the system dynamically determines an amount of the system that is idle and/or not saturated. The system may move data objects between data storage sections to optimize power consumption. Data sections may be reactivated at regular intervals, as described above and/or reactivated in response to a demand for more storage sections. Data objects with a likelihood of being reused either frequently and/or soon after the object is defined may be stored in storage sections that require less power than other storage sections.

If it is determined 515 that there is a significant amount of reuse (e.g., more reads than writes), then the estimated space of the object is compared 520 to a second threshold value. The second threshold value may be the size that is available in an activated memory section and/or the amount of space available in multiple activated memory sections. If the size is not greater than the second threshold, the data object may be stored in a second data storage section. The second data storage section may represent an activated memory storage section. If the size is above the second threshold, the object is compressed. In some cases, the amount of compression of the object depends on the amount of available space in the activated memory section. The size of the object may be compared to multiple thresholds to determine an appropriate level of compression of the object. Using different levels of compression may balance computation resources versus storage resources. In some cases, a check is made regarding power limitations, e.g., whether there is a need to conserve power via the compression hardware. If there are power limitations, the compression level may be set to a value that uses a lower amount of power while still providing some compression. While this example determines a compression rate based on a series of decision blocks, alternate techniques may be used. For example, a weighted formula may determine a compression level based on various factors, e.g., compression level=a*size+b*power_available+c*reuse_level.

The object size of the compressed object may be compared 530 to a third threshold. The third threshold may represent the space that is available in an activated memory section and/or the amount of space available in multiple activated memory sections. If it is determined 530 that the compressed object is not greater than the third threshold, the compressed data object may be stored in the second memory section. If it is determined that the size of the compressed object is greater than the third threshold, additional memory sections may be activated 540.

Figure 6:
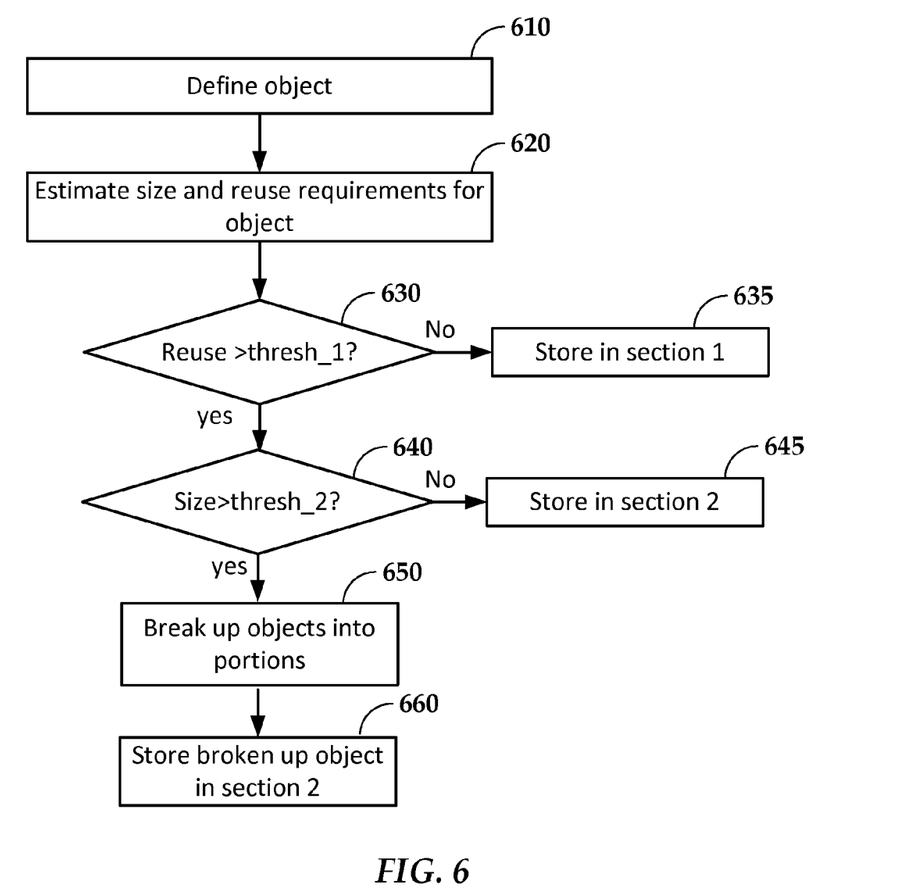

FIG. 6 is another flow diagram in accordance with embodiments described herein. Similarly to FIG. 5, an object is defined 610. Once defined, an estimation 620 is made of size and reuse requirements of the object. At block 630, a check is made as to the level of reuse, e.g., compared to a first threshold. If it is determined 630 that there is not a significant amount of reuse, the object may be stored 635 in a first data storage section. If it is determined 630 that there is a significant amount of reuse (e.g., more reads than writes), then the estimated space of the object is compared 640 to a second threshold value. The second threshold value may be the size that is available in an activated memory section and/or the amount of space available in multiple activated memory sections. If the size is not greater than the second threshold, the data object may be stored in a second data storage section. The second data storage section may represent an activated memory storage section. If the size is above the second threshold, the object broken 650 up into portions. Breaking the object into portions may include the compute section breaking computations into a series of computations. The broken up object may be able to fit in a reduced number of data storage sections. The broken up object may then be stored 660 in the second data storage section. This may also involve breaking the data objects into sub-objects, such as breaking matrix into smaller matrices.

Figure 7:
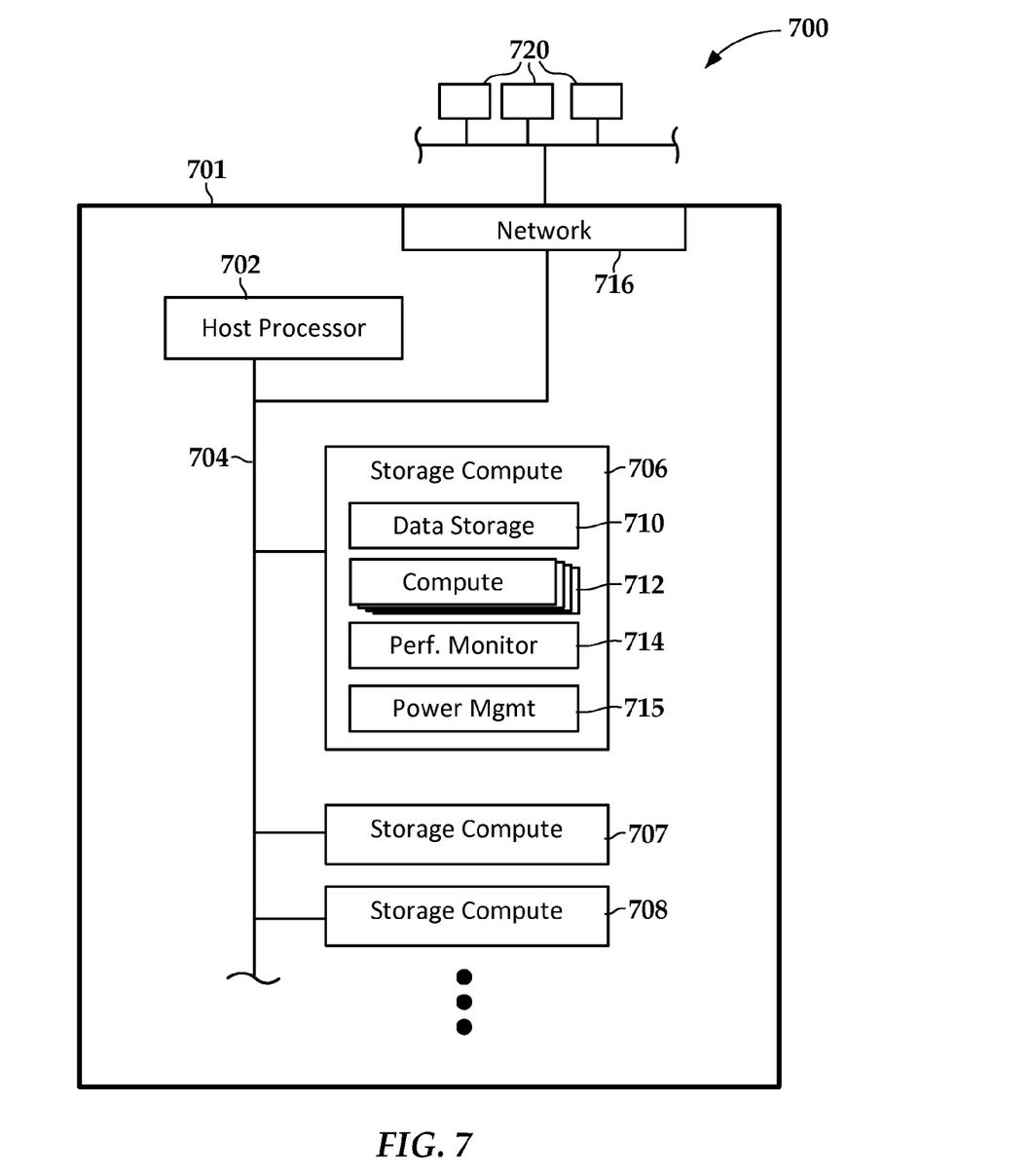
FIG. 7 is a block diagram of a system according to an example embodiment.

In reference now to FIG. 7, a block diagram illustrates a system 700 according to an example embodiment. The system includes a host device 701 with a host processor 702 that is coupled to a data bus 704. The data bus 704 may include any combination of input/output transmission channels, such as southbridge, PCI, USB, SATA, SaS, etc. One or more storage compute devices 706-708 are coupled to the data bus 704. As shown for storage compute device 706, each of the devices 706-708 includes a data storage section 710 that facilitates persistently storing data objects on behalf of the host processor. The data objects being internally managed by the storage compute device 706. The storage compute devices 706-708 include two or more compute sections 712 that perform computations on the data objects, and a performance monitor 714.

The performance monitor 714 makes a determination to activate and deactivate storage sections based on the demand for compute at a given time. A power management hardware section 715 activates and deactivates the data storage sections in response to the determination. The power management hardware section 715 may also perform other actions, such as compression or routing of data to ensure that activities fall cleanly on power control boundaries. The power control boundaries may include memory segments (e.g., erase units, memory die), memory access channels, mechanical components (e.g., servo motor, spindle motor), compute processors, RAM, etc.

The storage compute devices 706-708 may be able to coordinate distribution of parallel tasks (including providing guidance on power management) on a peer-to-peer basis, e.g., without coordination of the host processor 702. In other arrangements, the host processor 702 may provide some or all direction in dividing inter-host distribution of tasks in response to resource collisions. If the distribution of tasks extends to the network 720, then the host processor 702 may generally be involved, at least in providing underlying network services, e.g., managing access to the network interface, processing of network protocols, service discovery, etc.

The coordination provided by the host processor 702 may extend to controlling power consumption of the storage compute devices 706-708. For example, if power consumption of the host device 701 exceeds a threshold, the host processor 702 may signal the storage compute devices 706-708 to reduce power in ways as described above. This may be extended to the equivalent nodes of the network 720, such that power consumption of parts or all of a data center can be managed.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A storage compute device comprising:
   a host interface capable of communicating with a host computer, the host interface providing legacy storage functionality that includes storing data on and retrieving data from the storage compute device using an existing storage drive protocol, the host interface further configured to receive a computation instruction from the host computer that allows the storage compute device to provide an internal computation on behalf of the host computer;
   two or more data storage sections that facilitate persistently storing data objects in parallel read/write operations, the data objects used in computations within the storage compute device;
   a compute section that performs the computations on the data objects via the two or more data storage sections in response to the computation instruction;
   the compute section configured to: determine whether an amount of reuse of the data object of the data objects is greater than a first threshold;
   if it is determined that the amount of reuse is not greater than the first threshold, store the data object of the data objects in a first storage section of the two or more storage sections;
   if it is determined that the amount of reuse is greater than the first threshold, determine whether a size of the data object of the data objects is greater than a second threshold;
   if it is determined that the size is greater than the threshold, compress the data object of the data objects and store the data object of the data objects in a second storage section of the two or more data storage sections; and
   a processing unit that provides a signal to the compute section, wherein the signal causes at least the first data storage sections of the two or more data storage sections to be deactivated during the computations to reduce power usage of the storage compute device.

2. The storage compute device of claim 1, wherein at least one of the data objects is compressed to fit within a reduced number of the two or more data storage sections.

3. The storage compute device of claim 1, wherein the compute section breaks the computations into a series of computations using a portion of the data objects so that the portions of the data objects fit within a reduced number of the two or more data storage sections.

4. The storage compute device of claim 1, wherein the compute section comprises two or more compute subsections coupled to the two or more data storage sections, wherein the two or more compute subsections operate in parallel when performing the computations, and where the signal further causes deactivation of at least one of the compute sections associated with the at least one storage section.

5. The storage compute device of claim 1, wherein at least one of the computations creates a temporary intermediate object, wherein the intermediate object and associated data objects are stored in the data storage sections that are not deactivated in response to the signal.

6. The storage compute device of claim 1, further comprising power management hardware that deactivates and activates the storage sections.

7. The storage compute device of claim 6, the two or more data storage sections further comprise a plurality of channels each associated with separate portions of a storage medium, wherein the power management hardware comprises a plurality of power management units each independently coupled to one of the respective channels.

8. The storage compute device of claim 7, wherein the compute section further comprises a plurality of compute units each independently coupled to one of the respective power management units.

9. The storage compute device of claim 1, wherein the data objects comprise matrices.

10. The storage compute device of claim 1, wherein the two or more data storage sections comprise two or more tiers of memory and the processing unit further selects a tier of memory of the two or more tiers of memory for storage to reduce the power usage of the storage compute device.

11. A method, comprising:
    receiving a computation instruction from the host computer via a host interface that allows the storage compute device to provide an internal computation on behalf of the host computer, the host interface capable of providing legacy storage functionality that includes storing data on and retrieving data from the storage compute device on behalf of the host computer using an existing storage drive protocol;
    performing computations on data objects via two or more data storage sections in response to the computation instruction, the data storage sections facilitating persistently storing the data objects in parallel read/write operations, the data objects used in computations within a storage compute device;
    determining whether an amount of reuse of a data object of the data objects is greater than a first threshold;
    if it is determined that the amount of reuse is not greater than the first threshold, storing the data object of the data objects in a first storage section of the two or more storage sections;
    if it is determined that the amount of reuse is greater than the first threshold, determining whether a size of the data object of the data objects is greater than a second threshold;
    if it is determined that the size is greater than the threshold, compressing the data object of the data objects and storing the data object of the data objects in a second storage section of the two or more data storage sections; and deactivating at least a first data storage section of the two or more data storage sections during the computations to reduce power usage of the storage compute device.

12. The method of claim 11, wherein at least one of the data objects is compressed to fit within a reduced number of the two or more data storage sections.

13. The method of claim 11, further comprising breaking the computations into a series of computations using a portion of the data objects so that the portions of the data objects fit within a reduced number of the two or more data storage sections.

14. The method of claim 11, further comprising:
creating a temporary intermediate object; and
storing the intermediate object and associated data objects in the data storage sections that are not deactivated.

15. The method of claim 11, wherein the data objects comprise matrices.

16. The method of claim 11, wherein the two or more data storage sections comprise two or more tiers of memory, and the method further comprising selecting a tier of memory of the two or more tiers of memory for storage to reduce the power usage of the storage compute device.

17. The method of claim 11, further comprising:
receiving parametric data; and
deactivating at least one of the storage sections based on the parametric data.

18. A non-transitory, computer-readable storage medium configured with instructions executable by a processor of a storage compute device to perform:
receiving a computation instruction from the host computer via a host interface that allows the storage compute device to provide an internal computation on behalf of the host computer, the host interface capable of providing legacy storage functionality that includes storing data on and retrieving data from the storage compute device on behalf of the host computer using an existing storage drive protocol;

performing computations on data objects via two or more data storage sections in response to the computation instruction, the data storage sections facilitating persistently storing the data objects in parallel read/write operations, the data objects used in computations within the storage compute device;

determining whether an amount of reuse of a data object of the data objects is greater than a first threshold;

if it is determined that the amount of reuse is not greater than the first threshold, storing the data object of the data objects in a first storage section of the two or more storage sections;

if it is determined that the amount of reuse is greater than the first threshold, determining whether a size of the data object of the data objects is greater than a second threshold;

if it is determined that the size is greater than the threshold, compressing the data object of the data objects and storing the data object of the data objects in a second storage section of the two or more data storage section; and deactivating at least a first data storage section of the two more data storage sections during the computations to reduce power usage of the storage compute device.

19. The computer-readable storage medium of claim 18, wherein at least one of the data objects is compressed to fit within a reduced number of the two or more data storage sections.

20. The computer-readable storage medium of claim 18, wherein the instructions further cause to storage compute device to break the computations into a series of computations using a portion of the data objects so that the portions of the data objects fit within a reduced number of the two or more data storage sections.

* * * * *